Oct. 1, 1957 N. R. ROBINSON 2,808,228
TURBO-MACHINES
Filed April 3, 1952 2 Sheets-Sheet 2
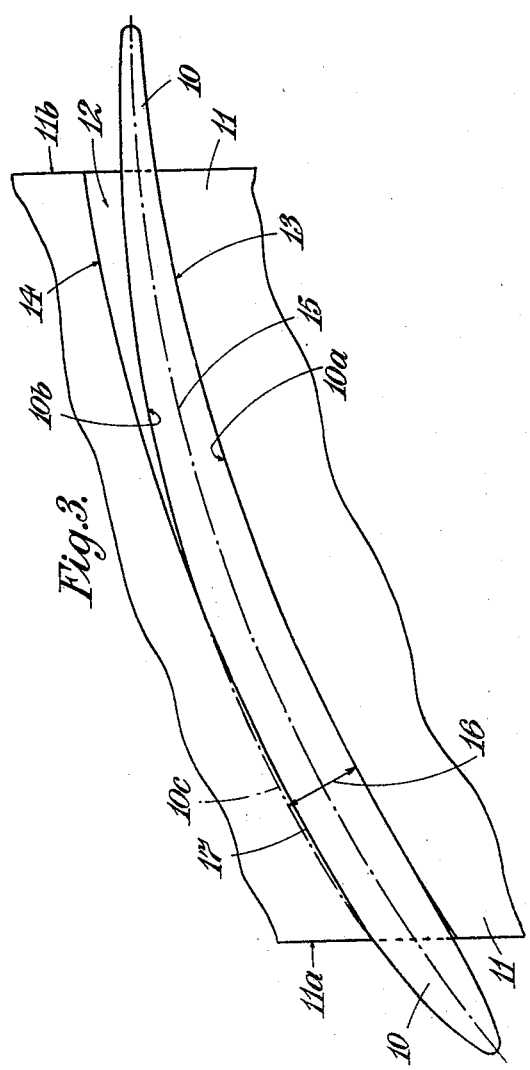
INVENTOR
N. R. ROBINSON
By Wilkinson & Mawhinney
ATTYS.

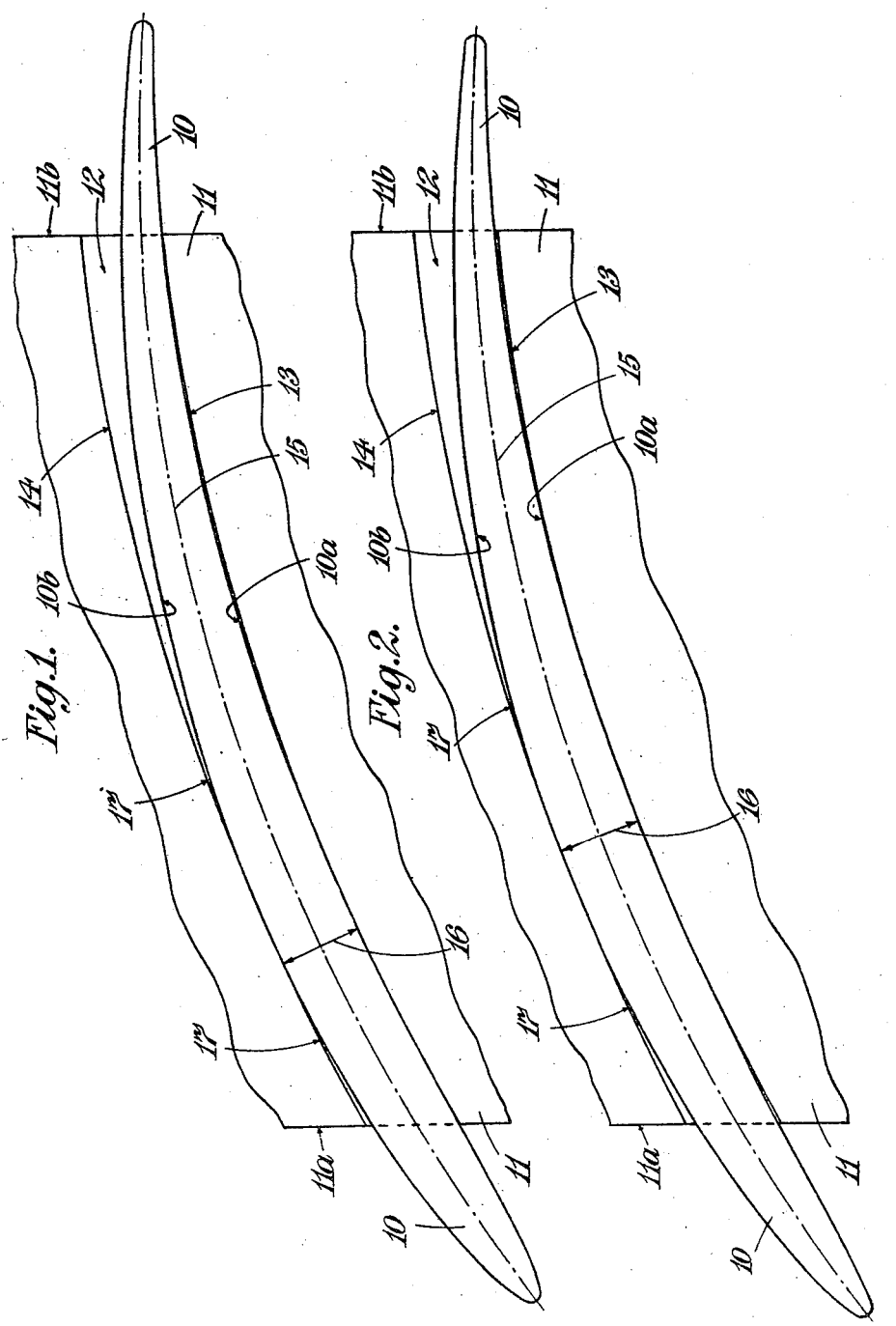

United States Patent Office 2,808,228
Patented Oct. 1, 1957

2,808,228

TURBO-MACHINES

Norman Robert Robinson, Quarndon, Derby, England, assignor to Rolls-Royce Limited, Derby, England, a British company Application April 3, 1952, Serial No. 280,234

6 Claims. (Cl. 253—77)

This invention relates to turbo-machines such for instance as compressors and turbines of the kind forming part of a gas-turbine engine and this invention has for an object a simplified and inexpensive means for securing blades to rotor discs or drums or stator parts.

According to this invention a blade which is made from a blank having an aerofoil section substantially throughout its length, is secured to a supporting part by the steps of cutting in said part a curved, parallel-sided slot whereof the curvature conforms substantially to that of camber line of the blade to be secured to the part and whereof the walls are spaced apart by an amount substantially equal to the maximum thickness of the blade, inserting an end of the blade into the slot and brazing the blade in position.

It has been observed that the camber-line of a blade is often an arc of a circle, and according to a feature of this invention the slot may be formed by a simple milling operation with an open-ended milling cutter.

The blades may be of uniform aerofoil section throughout their length and may be produced by forming a long bar of uniform aerofoil section and cutting off the desired length to form a blade. The blade may be given any required twist after being parted from the bar.

With many blades, the concave surface is substantially parallel to the camber line and as a result satisfactory brazing can normally be obtained over the major portion of the concave surface of the end of the blade within the slot. However, satisfactory brazing can normally be obtained only over approximately one-third of the convex surface, due to the greater curvature of this surface and the fact that satisfactory brazing can only be obtained with clearance of less than about .002 inch.

The extent of satisfactory brazing can if desired be increased by making the slot width slightly less than the maximum thickness of the blade blank and subjecting the convex or concave surfaces or both to a slight grinding operation to reduce the end of the blade to the desired thickness to enter the slot. The extent of grinding should be limited otherwise the blade will be weakened and will be unable to withstand the loads to which it is subjected in use.

The extent of satisfactory brazing can be increased still further by providing, as by forging, on the blank end a curved parallel-sided root portion, the thickness of which is substantially equal to the maximum thickness of the blade section. With such an arrangement the blade-root fits substantially within the slot.

Reference will now be made to the accompanying drawings which illustrate on a much enlarged scale blade roots fitted in a disc periphery.

Figure 1 is a developed plan view showing a portion of a rotor disc with blade roots secured thereto.

Figure 2 is a developed plan view of a modification of the structure shown in Figure 1.

Figure 3 is also a developed plan view of a further modification.

In the arrangements of Figures 1 and 2, the blades 10 which have slightly different aerofoil sections are shown mounted in the periphery of a thin disc 11, that is a disc which has an axial thickness less than the chordal dimension of the blades 10 carried by it. The blades 10 are produced to have a substantially uniform aerofoil section throughout their length including their root portions. The disc periphery is then slotted by a side-milling operation with a hollow side-cutter; the circular-arc-form slots 12 thus produced in the disc extend radially inwards from the periphery, and from the front surface 11a to the back surface 11b of the disc 11; the walls 13, 14 of the slots 12 are part-cylindrical and coaxial. The mean diameter of the cutting teeth of the hollow side-cutter with which slots 12 are produced, is selected to be substantially equal to the diameter of the camber-line 15 of the blades 10, the camber-line being a circular arc. The cut has a thickness equal substantially to the maximum thickness of the blade 10, this thickness being indicated by the line 16. The camber-lines 15 and slots 12 are the same in both Figures 1 and 2 although the blade sections are different.

The blades 10 after being copper-plated at their root ends, that is the ends of the blades to be entered into the slots 12, are inserted radially into the slots to abut each against the bottom of the slot and are then tack welded at their inner ends to one end surface of the disc. The assembly formed by disc 11 and blades 10 is next placed in a brazing oven to braze the blades into the slots, the disc being arranged with its axis vertical and tack welds uppermost.

The concave surface 10a of each blade 10 is at each section almost a circular arc concentric with the camber-line 15 and, as will be seen from Figures 1 and 2, with a blade having a section as shown in Figure 1, its position in the slot 12 is such that its concave surface 10a is substantially in contact with the wall 13 adjacent the ends of the slot 12 and slightly spaced away from this wall adjacent the mid-section, and that with the blade section of Figure 2, the blade 10 projects more beyond the front face 11a of the disc, and the concave surface 10a is substantially in contact with the wall over its mid-section and slightly clear adjacent the ends of the slot 12. However, in each case the clearance is small and a good brazed joint may be obtained substantially over the whole of the wall 13.

The convex surface 10b has a much larger curvature than the adjacent wall 14 and is only in contact with the wall 14 for a short distance on each side of its point of maximum thickness. Thus a good brazed joint will be obtained only over a small area of the wall 14 say between points 17.

If it is desired to increase the area of contact over either wall the root end of the blade may be slightly ground. For instance, as indicated in Figure 3, a blade 10 may have the part of its original convex surface indicated by chain line 10c ground away thereby to conform to the curvature of the wall 14. In this case the slot width is slightly less than the maximum thickness of the aerofoil section as indicated at 16.

It is preferred that in addition to brazing the convex face 10b and concave face 10a of the blade 10 to the walls 14, 13 of the slot 12, the blade be bottomed in the slot and the end surface of the blade brazed to the bottom of the slot, so that for instance, when the blade is a rotor blade secured in a disc the centrifugal load is accommodated by a brazed joint in tension and brazed joints in shear.

I claim:

1. A method of securing to a supporting part a blade made from a blade blank having an aerofoil-section throughout its length, the aerofoil section having a curved camber line, which method comprises the steps of grinding away the convex surface of the blade blank at its root end to give the root end a substantial surface portion of curvature conforming to that of the camber line of the blade, cutting in said supporting part a curved slot whereof the walls are uniformly spaced throughout the depth of the slot and whereof the curvature of the walls conforms substantially to that of the camber line of the aerofoil section and whereof the walls are spaced apart by an amount substantially equal to the maximum thickness of the blade at the root end thereof, whereby when the root end of the blade is inserted into the slot substantial portions of the walls of the slot and the adjacent blade surfaces have only a small clearance therebetween, inserting said root end of the blade into the slot, and brazing the root end of the blade in position in the slot.

2. A method as claimed in claim 1, wherein the slot is cut in the form of a circular arc having a mean radius substantially equal to the radius of curvature of the camber line of the aerofoil section of the blade.

3. A method as claimed in claim 1 comprising also the steps of forming the blade blanks by cutting off lengths from a bar of uniform aerofoil section and imparting a twist to the blade blank after it has been parted from the bar.

4. A method as claimed in claim 1 comprising also shaping the root end of the blade by slightly grinding away part at least of the concave surface of the blade blank at the root end thereof.

5. In a turbo-machine, a supporting part, and at least one blade carried by said supporting part, said blade having an aerofoil section throughout its length and having a camber, said supporting part having formed therein a slot having opposed wall surfaces which are parallel thereby to have a uniform spacing throughout the depth of the slot and have curvatures conforming substantially to the curvature of the camber line of the blade, said blade having an end projecting in a direction lengthwise of the blade into the slot, said end having a portion between its leading and trailing edges of which the sides are parallel to one another and to the camber line of the blade and having a thickness substantially equal to the spacing of the opposed wall surfaces of the slot in the supporting part, and a brazed joint between at least said portion of the blade and adjacent portions of the wall surfaces of the slot.

6. A method of securing to a supporting part a blade made from a blade blank having an aerofoil section throughout its length, the aerofoil section having a curved camber line, which method comprises the steps of grinding away the convex surface of the blade blank at its root end to give the root end a substantial surface portion of curvature conforming to that of the camberline of the blade, cutting in said supporting part a curved slot whereof the walls are uniformly spaced throughout the depth of the slot and whereof the curvature of the walls conforms substantially to that of the camberline of the aerofoil section and whereof the walls are spaced apart by an amount substantially equal to the maximum thickness of the blade at the root end thereof, whereby when the root end of the blade is inserted into the slot substantial portions of the walls of the slot and the adjacent blade surfaces have only a small clearance therebetween, inserting the root end of the blade into the slot, tack welding the blade to the supporting part and inserting the supporting part with the blade tack welded thereto into a brazing oven and brazing the blade finally into position over said portions of the walls of the slot and the adjacent blade surface which have small clearance.

References Cited in the file of this patent

UNITED STATES PATENTS

| | | |
|---|---|---|
| 746,061 | Fullager | Dec. 8, 1903 |
| 1,187,445 | Marquis | June 13, 1916 |
| 1,637,224 | Leitner | July 26, 1927 |
| 1,719,415 | Back | July 2, 1929 |
| 1,740,800 | Wiberg | Dec. 24, 1929 |
| 1,793,468 | Densmore | Feb. 24, 1931 |
| 1,888,508 | Kastert | Nov. 22, 1932 |
| 2,090,468 | Brown | Aug. 17, 1937 |
| 2,143,467 | Allard | Jan. 10, 1939 |
| 2,365,977 | Stine | Dec. 26, 1944 |
| 2,483,610 | Baumann | Oct. 4, 1949 |

FOREIGN PATENTS

| | | |
|---|---|---|
| 170,177 | Germany | May 1, 1906 |
| 587,923 | Germany | Nov. 11, 1933 |